United States Patent Office 2,974,014
Patented Mar. 7, 1961

2,974,014

TREATMENT OF METALLIC ORES

Howard H. Hoekje and Robert A. Kearley, Corpus Christi, Tex., assignors to Columbia-Southern Chemical Corporation, a corporation of Delaware No Drawing. Filed Nov. 14, 1955, Ser. No. 546,770

17 Claims. (Cl. 23—202)

This invention relates to the beneficiation of metallic ores. More particularly, the present invention involves the treatment of ores, such as ilmenite and the like, using liquid, substantially anhydrous alkali metal hydroxide and separting the phases thus formed. Usually the process results in production of a liquid anhydrous alkali metal hydroxide phase and a solid phase which may be separated.

According to a particular embodiment of this invention it has been found that a titanium-iron ore, such as ilmenite or like oxide ore, may be contacted with liquid anhydrous or substantially anhydrous alkali metal hydroxide and that in consequence a liquid phase containing the major portion of the titanium and unreacted alkali metal hydroxide and a solid phase comprising a major portion of the iron and little titanium are formed. Upon separation of these phases by filtration, decantation, settling, and the like, the titanium to iron ratio in the liquid phase is found to be substantially above the titanium to iron ratio of the ore.

When treating ilmenite, for instance, with an alkali metal hydroxide the resulting liquid phase, having been separated from the solid phase, may be cooled and leached with a solvent, such as water, to remove the alkali metal hydroxide, thus producing a product titanium hydrate having a greatly increased titanium:iron ratio. The leach alkali metal hydroxide solution, on standing, hydrolizes to precipitate out most of the trace impurities, giving an alkali metal hydroxide solution of relatively high purity which may be recycled or used for other purposes.

A remarkable feature of the instant embodiment involves the fact that leaching of the alkali metal hydroxide and titaniferous-iron ore reaction product with water, for instance, removes most of the alkali metal hydroxide free from the titanium-rich solids without dissolving appreciable quantities of other materials. Hence, when the alkali metal hydroxide is used through several cycles of fusion with ore, separation from insoluble components and subsequent leaching, impurities do not build up excessively in the alkali metal hydroxide. A still further remarkable feature is that the leach solution containing alkali metal hydroxide, on standing, hydrolyzes to precipitate out most of the trace impurities, giving an alkali metal hydroxide solution of relatively high purity. These features among other which will be easily recognizable from the disclosure to follow are the reason the present invention is a great contribution to the art of metallic ore beneficiation.

Generally speaking, therefore, the process of the present invention involves the reaction of an alkali metal hydroxide with a metallic ore at a temperature sufficiently high to solubilize one component of the ore but below that at which all components are solubilized and separating the liquid phase from the insoluble or solid phase. By contacting solid metallic ores with fused anhydrous alkali metal hydroxide at a proper temperature it is possible to separate the soluble metallic constituents from the insoluble metallic constituents by the efficient process of the present invention. In other words, by contacting a composition comprising oxides of several elements in solid state, e.g., titaniferous-iron ore, with liquid anhydrous alkali metal hydroxide, solid oxides insoluble in the alkali metal hydroxide settle out and soluble oxides in fused alkali metal hydroxide react therewith and may be readily removed from the fused anhydrous alkali metal hydroxide by leaching with an inert solvent.

Obviously, the process of the present invention is applicable to numerous metallic ores, such as tungsten-iron ore, chromite-iron ore (the chromium values having been oxidized to the hexavalent state), carnotite, etc. Carnotite, or like mixtures or concentrates, which contains uranium oxide (such as $UO_3$ or $U_3O_8$) and vanadium oxide (such as $V_2O_3$, $V_2O_5$ or $VO_2$) readily lends itself to the process of the present invention in that its uranium oxide content is only very slightly soluble in liquid anhydrous sodium hydroxide, while the vanadium oxide is appreciably soluble in such sodium hydroxide.

It follows, therefore, that certain metallic ores containing barium carbonate, chromium trioxide, titanium dioxide, tungsten trioxide, vanadium pentoxide, and the like, all of which are soluble to an appreciable degree in liquid anhydrous sodium hydroxide, may be beneficiated by treatment with sodium hydroxide to remove any insoluble or sligthly soluble constituent therefrom. Typical of the insoluble or slightly soluble metal oxides found in ores within the scope of the present invention are aluminum oxide, calcium oxide, chromium sesquioxide, ferric oxide, silicon dioxide, stannic oxide, triuranium octoxide, zirconium dioxide, and the like.

Any combination of these soluble and insoluble metal oxides in a metallic ore, or like composition or mixture, may be treated with caustic soda to separate soluble oxides from insoluble oxides.

The contribution to the art afforded by the present invention is unique in the science of ore beneficiation in that it offers a simple and practical method for beneficiating ores and thereby enables the practitioner to circumvent the heretofore cumbersome and impractical methods of the prior art.

To the accomplishment of the foregoing and related ends the present invention comprises the features hereinafter fully described and particularly pointed out, the following description setting forth in detail certain illustrative embodiments of the invention. These embodiments are merely indicative, however, of but a few of the various ways in which the principle of the invention may be employed.

According to a particular embodiment of the present invention, therefore, a process for the beneficiation of a titaniferous-iron ore is carried out by fusing ilmenite, for instance, with an alkali metal hydroxide. The alkali metal hydroxide preferred is caustic soda, although other alkali metal hydroxides, such as potassium hydroxide, lithium hydroxide, or cesium hydroxide, may be employed. Thus, for example, weighed quantities of caustic soda and ilmenite may be fused together in suitable vessels and heated in an electric crucible furnace. When reaction, as evidenced by the evolution of gas, has ceased, the undissolved solid matter in the melt is allowed to settle from the liquid thus obtained.

The temperature employed in the instant process is dependent upon the metallic ore being treated, there being various metal oxides having a greater ratio of solubilities at a relatively low temperature than at a higher temperature, and vice versa. A typical example of the former is ilmenite which (as will be seen hereinafter) is beneficiated to a greater degree at a relatively low tmperature.

The temperature frequently plays an important part in the efficiency of the fusion step of the present invention and, in many cases, there is a definite correlation between said temperature and the amount and relative proportion of a metal oxide which is dissolved or enters the liquid phase with the alkali metal hydroxide. The concentration of the constituent metal oxides in the metallic ore is also to be reckoned with in the process of the present invention.

Thus, when a titaniferous-iron ore such as ilmenite containing about 59 percent by weight $TiO_2$ and 35 percent by weight $Fe_2O_3$, the ratio of $TiO_2$ to $Fe_2O_3$ being 1.69, is fused according to the present invention with caustic soda, the ilmenite being present at a 9.5 percent by weight concentration, and the reaction having gone to completion as evidenced by the cessation of gas evolution, a sample of the liquid alkali metal hydroxide phase taken at 700° C. has a $TiO_2/Fe_2O_3$ ratio of 16. This obviously constitutes a substantial beneficiation. However, by taking a sample of the liquid phase produced by the same mixture at 500° C. a product having a $TiO_2/Fe_2O_3$ ratio of 37 is obtained. It can be seen from these examples that lower temperatures give manifestly greater beneficiation. While this is not necessarily true of all metallic ores, it is indeed true of ilmenite. As will be seen hereinafter, a wide range of concentrations and temperatures may be used satisfactorily.

Fusion of caustic soda and ilmenite, for example, is best accomplished at temperatures ranging from 500° C. to 950° C., generally about 600° C. to 800° C., although higher or lower temperatures may be employed. The practical criterion to be employed in determining when reaction has ceased is the cessation of gas evolution. Then it is that a stable condition results. The evolved gases are visually discernible without the assistance of optical aids.

Frequently found in titanium ores in appreciable quantities are oxides of silicon and aluminum, with occasional appearance of manganese. The solubility of these oxides in fused caustic is very slight, however. It has been found that by heating a mixture of 5 parts anhydrous caustic soda and 1 part alumina at 800° C., until all visible gas has ceased evolving, the solubility of alumina in the fused caustic soda is less than one (1) percent by weight. Similarly, silica and manganese oxide are slightly soluble in fused caustic soda at the same temperature and in equal proportions.

On the other hand, metal oxides and carbonates such as vanadium pentoxide, tungsten trioxide, chromium trioxide, barium carbonate, etc., as stated hereinabove are quite soluble in anhydrous caustic soda. According to the present invention, therefore, anhydrous caustic soda may be used to beneficiate a carnotite ore, or vanadium oxide-uranium oxide concentrates, or other materials having uranium oxide and vanadium pentoxide values, since the uranium oxide values are only slightly soluble in molten anhydrous NaOH and the vanadium pentoxide values are highly soluble in molten anhydrous NaOH. Other compositions having uranium oxide in various proportions and vanadium pentoxide may also be beneficiated by the instant process.

It has been found according to the present invention that sodium chloride is highly soluble in fused anhydrous caustic and should be avoided in the treatment of titanium oxide-iron oxide bearing ores or slags with fused alkali metal hydroxide. The presence of sodium chloride decreases the solubility of said titanium oxide in fused caustic soda. However, after the caustic soda containing the titanium dioxide therein is separated from the iron oxide, sodium chloride may be added to the fused mixture to precipitate the titanium dioxide.

From the preceding disclosure, therefore, it is quite apparent that metal oxides may be treated in their corresponding ores with fused caustic soda to give practical and economical results. Thus, the metallurgy of the less common metals, especially those with industrial promise, is afforded a significant contribution as a result of the present invention. For example, titanium ores, such as ilmenite, uranium-vanadium ores, such as carnotite, etc., may be greatly enhanced in their commercial value by treatment with liquid anhydrous caustic according to the present invention.

In order to illustrate several methods of beneficiating metallic ores with alkali metal hydroxide the following examples are given. Unless otherwise specified percentages are given by weight in these examples.

EXAMPLE I

A nickel crucible, 1 inch in diameter and 6 inches high, was loaded with approximately 90 grams of anhydrous sodium hydroxide pellets and 23 grams of pulverized ilmenite containing 59 percent by weight $TiO_2$ and 35 percent by weight $Fe_2O_3$, the ratio of $TiO_2$ to $Fe_2O_3$ being 1.69. The crucible was heated to about 750° C. in a crucible furnace heating chamber of 3 inch diameter and 5 inch height. When reaction had ceased, as evidenced by the fact that no more gas evolved, the furnace was cooled to 680° C. and undissolved solids were allowed to settle to the bottom of the crucible. A sample was dipped from the upper portion of the melt which contained no appreciable amount of undissolved solids. According to polarographic analysis of the dip sample it contained 13.2 percent by weight $TiO_2$, 1.93 percent by weight $Fe_2O_3$. Acid titration showed 88.8 percent by weight NaOH. The dip sample weighed about 34.23 grams.

EXAMPLE II

Ilmenite (59 percent by weight $TiO_2$ and 35 percent by weight $Fe_2O_3$) was admixed with anhydrous caustic soda and the mixture was fused in a nickel crucible by means of a crucible furnace as in Example I, the ilmenite being present in 9.5 percent by weight concentration, based on the total weight. The reaction having gone to completion, as evidenced by the cessation of evolved gas, the resulting melt was cooled to 700° C. and allowed to stand until undissolved solids settled out and a dip sample of the melt was taken which, when analyzed polarographically, contained 4.1 percent by weight $TiO_2$ and 0.25 percent by weight $Fe_2O_3$, which represented a $TiO_2/Fe_2O_3$ ratio of 16.

Another dip sample of the melt was taken at a temperature of 500° C. after the melt had been allowed to stand and undissolved solids settled out; when polarographically analyzed the sample showed 4.4 percent by weight $TiO_2$ and 0.12 percent by weight $Fe_2O_3$, which represented a $TiO_2/Fe_2O_3$ ratio of 37.

EXAMPLE III

Anhydrous caustic soda was admixed with a 20 percent by weight portion (based on the total weight) of ilmenite containing 59 percent by weight $TiO_2$ and 35 percent by weight $Fe_2O_3$ (which represents a 1.69 $TiO_2/Fe_2O_3$ ratio) and the mixture heated to reaction in a nickel crucible by means of a crucible furnace. The reaction having gone to completion, as evidenced by the cessation of gas evolution, the resulting melt was cooled to 620° C. and allowed to stand until undissolved solids settled out and a dip sample of the melt was removed and polarographically analyzed. The analysis showed 12.3 percent by weight $TiO_2$ and 1.60 percent by weight $Fe_2O_3$, which represents a $TiO_2/Fe_2O_3$ ratio of 7.7.

Another dip sample of the melt was taken at 570° C. after the melt had been allowed to stand and undissolved solids settled out. Analysis of the sample showed 12.4 percent by weight $TiO_2$ and 1.02 percent by weight $Fe_2O_3$, which represents a $TiO_2/Fe_2O_3$ ratio of 12.

A third dip sample of the melt was taken at 550° C. after allowing undissolved solids to settle out and analysis showed 6.9 percent by weight $TiO_2$ and 0.53 percent by weight $Fe_2O_3$, which represents a $TiO_2/Fe_2O_3$ ratio of 13.

EXAMPLE IV

A sodium hydroxide-titanium dioxide liquid mixture prepared in the manner described in Example I was separated from undissolved iron oxide and was found to contain 8.53 grams of $TiO_2$, 0.61 gram of $Fe_2O_3$ and 71.7 grams of NaOH. This sample was leached with 4 successive portions of boiling water. The first filtrate (135 grams) contained 0.09 gram of $TiO_2$, 0.27 gram of $Fe_2O_3$ and 54.9 grams of NaOH; the second filtrate (118 grams) contained no $TiO_2$, no $Fe_2O_3$ and 11.0 grams of NaOH; the third filtrate (109 grams) contained no $TiO_2$, no $Fe_2O_3$ and 1.0 gram of NaOH and the fourth filtrate (245 grams) contained no $TiO_2$, no $Fe_2O_3$ and 0.4 gram NaOH.

The resulting leached product contained 8.12 grams of $TiO_2$, 0.68 gram $Fe_2O_3$ and 2.6 grams of NaOH.

The first filtrate, on standing, gave a precipitate which was filtered off. The solid portion weighed approximately 0.3 gram and was analyzed spectrographically for trace elements as was the clear liquid. The following table shows the results:

*Table I*

TRACE ELEMENTS IN HYDROLYZED LEACH SOLUTION

|  | Greater than 10% | 1%–10% | 0.01%–0.1% | Less than 0.01% |
|---|---|---|---|---|
| Solid | Na | Fe, Ti, Mn | Cu, Si, Mg | Al, V, Cr |

|  | Greater than 30% | 0.03%–0.3% | Less than 0.03% |
|---|---|---|---|
| Liquid [1] | Na | Si, Al, V, Cr | Cu, Ti, Ag, Mn, Fe, Mg |

[1] Results reported on solid caustic basis.

The results shown in the foregoing examples indicate that increasing the concentration of ilmenite in the melt decreases the $TiO_2/Fe_2O_3$ ratio in the dip sample from said melt. This is probably more strictly an effect of temperature than of concentration, since higher temperatures are required to keep the high-concentration fusions in the liquid state.

As shown in Example IV leaching with water removes substantially all of the caustic soda from the solidified liquid alkali metal hydroxide phase without dissolving appreciable quantities of other materials such as titanium dioxide. About 94 percent of the caustic soda was recovered in the water leach. This represents a significant embodiment of the present invention. It is also evident from Example IV that the caustic soda which remains with the solids after leaching is considerably less than one mole of $Na_2O$ per mole of $TiO_2$ therein. Hence, the sodium titanate or other titanium compound which forms or is dissolved during fusion is probably largely or completely broken by hydrolysis during the leaching process. It is not known in what form the caustic soda is present in the solids after leaching but it seems very probable that it may be absorbed on the solids or it may be physically held within the particles, requiring only finer grinding for its removal. As indicated by the table in Example IV, most of the iron, titanium and manganese present in the leach solution separated out, leaving a solution containing not more than 0.3 percent by weight of any minor constituent.

This particular feature of the present invention affords a caustic of very good purity which may be used to react with another portion of ilmenite. This is but one of the various attractive features of the present invention.

An additional feature of the present invention comprises filtering a dip sample of the caustic soda fusion melt and thereby increasing the $TiO_2/Fe_2O_3$ ratio substantially. It appears that a certain proportion of the $Fe_2O_3$ present in the melt is suspended therein. By passing a sample of the melt through a sintered stainless steel filter element having a pore size of about 5 microns substantially all of the suspended $Fe_2O_3$ in said melt can be removed. It was also determined, in connection with this feature, that low concentrations of ilmenite in fused caustic result in better removal of suspended $Fe_2O_3$ than high concentrations, although the $Fe_2O_3$ removal from high concentrations is very acceptable. Thus, according to the present invention not only is iron removed by settling, but the additional expedient of filtering may be employed to greatly increase the $TiO_2/Fe_2O_3$ ratio by removing suspended iron in the fusion melt.

Still another embodiment of the present invention involves the selective removal of titanium from the fused caustic soda by cooling to effect crystallization. Upon cooling crystals usually form at the top surface of the fusion melt and may be removed therefrom and leached with water. The remaining fusion melt may be reheated and once again cooled to form more crystals. Thus, successive heating and cooling operations permit the ready removal of crystals from the fusion melt. Upon leaching, of course, hydrolysis takes place and the caustic soda is easily separated from $TiO_2$.

In the present invention the metallic ore concentration in the fused alkali hydroxide may range from 1 to about 50 percent by weight or more. Normally the amount of alkali metal hydroxide in the liquid phase produced in this process should be at least 40 to 60 percent by weight of said liquid phase. In the case of ilmenite or like ore about 5 to 30 percent by weight ilmenite based upon the total weight of the mixture is preferred.

Although a slightly aqueous alkali metal hydroxide may be used, best results are achieved using anhydrous alkali metal hydroxide.

It is also a particular feature of the present invention that the insoluble metal oxide, e.g., $Fe_2O_3$ in ilmenite, is not substantially reduced to metallic iron in the reaction of the metal oxides with alkali metal hydroxide.

The following table gives the solubility of titanium dioxide ($TiO_2$) and iron oxide ($Fe_2O_3$) in anhydrous caustic soda at various temperatures. From this table it will become apparent that the solubility of iron oxide in anhydrous caustic soda ranges from about 0.1 percent by weight (based on the total weight) at 500° C. to about 4 percent by weight at 800° C. At the same time, titanium dioxide ranges in solubility from about 1 percent at 400° C. to about 25 percent at 800° C. by weight, based upon the total weight.

*Table II*

| Temperature, ° C. | Percent by Weight $TiO_2$ | Percent by Weight $Fe_2O_3$ |
|---|---|---|
| 400 | 1 | 0.0 |
| 500 | 4 | 0.1 |
| 600 | 9 | 1.0 |
| 700 | 15 | 2 |
| 800 | 25 | 4 |

The solubility of various other materials in anhydrous liquid sodium hydroxide has been tested. Some of the data which have been obtained are as follows:

| Compound | Solubility |
|---|---|
| Aluminum oxide ($Al_2O_3$) | Less than 1 percent at 800° C. |
| Bismuth trioxide ($Bi_2O_3$) | Less than 1 percent at 750° C. |
| Calcium oxide | 0.7 percent at 725° C. |
| Chromic oxide ($Cr_2O_3$) | Less than 1 percent at 800° C. |
| Silicon dioxide ($SiO_2$) | 2.7 percent at 660° C. |
| Tin oxide ($SnO_2$) | Less than 0.1 percent at 635° C. |
| Triuranium octoxide ($U_3O_8$) | 0.3 percent at 635° C. |
| Zirconium oxide ($ZrO_2$) | 0.75 percent at 900° C. |
| Barium carbonate ($BaCO_3$) | At least 23 percent at 318° C. |
| Sodium chloride | 36 percent at 408° C. |
| Vanadium oxide ($V_2O_3$) | At least 9.1 percent at 330° C. |
| Vanadium oxide ($V_2O_5$) | At least 50 percent at 620° C. |
| Tungsten trioxide ($WO_3$) | At least 7 percent at 340° C. |

The above percentages are by weight based upon the total weight of the constituents of the system.

The above invention has been described with particular reference to the use of sodium hydroxide. As stated hereinabove, it should be understood that other alkali metal hydroxides, such as potassium hydroxide, lithium hydroxide or cesium hydroxide may be used in lieu of or in conjunction with sodium hydroxide.

From the above tables it will be noted that the solubility of various metal oxides differs at various temperatures. This affords a convenient method of separating metal oxides from the alkali metal hydroxide. As a typical example, ilmenite or like titanium iron oxide bearing ore, may be contacted with alkali metal hydroxide, such as sodium hydroxide, to produce a liquid phase and a solid phase which contains a major portion of the iron oxide. This mixture may be treated to remove the solid phase from the liquid phase as for example by filtration and/or settling. When such a process is conducted at an elevated temperature, for example 600 to 800° C., it is possible to obtain a solution or mixture containing a very appreciable amount of titanium dioxide. Following separation of the iron oxide solid phase from this liquid mixture, the liquid mixture may be cooled to a lower temperature, for example 400° C., whereupon a portion of the titanium oxide precipitates either as such or as a titanate. Consequently, the solid precipitated titanium compounds may be separated from the anhydrous liquid caustic soda and the liquid caustic soda recycled for treatment of further ilmenite. It will also be apparent that this process may be conducted with other previously-mentioned ores in lieu of ilmenite.

Although the present invention has been described with reference to the specific details of certain embodiments, it is not intended that such embodiments shall be regarded as limitations upon the scope of the invention except insofar as included in the accompanying claims.

We claim:

1. A method of separating oxides of elements forming solid oxides which comprises contacting with fused alkali metal hydroxide a composition comprising oxides of elements in solid state, one of the oxides being soluble and one being insoluble in the fused alkali metal hydroxide, without substantial reduction of the insoluble oxide to elemental state to form a composition having a liquid component rich in an element of an oxide soluble in fused alkali metal hydroxide and a solid component rich in an oxide insoluble in the fused alkali metal hydroxide, and separating solid component rich in an oxide insoluble in fused alkali metal hydroxide from liquid phase component.

2. A method of separating oxides of elements forming solid oxides which comprises contacting with fused alkali metal hydroxide a composition comprising oxides of elements in solid state, one of the oxides being soluble and one being insoluble in the fused alkali metal hydroxide, without substantial reduction of the insoluble oxide to elemental state to form a composition having a liquid component rich in an element of an oxide soluble in the fused alkali metal hydroxide and a solid component rich in an oxide insoluble in the fused alkali metal hydroxide, separating solid component rich in an oxide insoluble in the alkali metal hydroxide from liquid component, leaching separated liquid component with a solvent for alkali metal hydroxide to remove said alkali metal hydroxide and recovering soluble metal oxide therefrom in solid state.

3. In the method of claim 2 wherein the liquid component is separated from solid component by settling and removal of liquid component from residual solid component.

4. A method of separating oxides of elements forming solid oxides which comprises contacting a composition comprising oxides of elements in solid state with fused alkali metal hydroxide, one of the oxides being soluble and one being insoluble in the fused alkali metal hydroxide, forming a composition having a liquid component rich in an element of an oxide soluble in the fused alkali metal hydroxide and a solid component rich in an oxide insoluble in the fused alkali metal hydroxide, separating solid component rich in an oxide insoluble in the fused alkali metal hydroxide from liquid component, the said composition formed by combining oxide with fused alkali metal hydroxide containing a solid oxide content in the concentration of about 5 to about 30 percent by weight based upon the total weight of the oxides and alkali metal hydroxide.

5. The method of separating titanium from iron-titanium oxide bearing material which comprises contacting said material with fused alkali metal hydroxide and separating resulting titanium rich component from iron oxide rich solid component, the amount of iron-titanium bearing material contacted with fused alkali metal hydroxide constituting from about 5 to about 30 percent by weight of the total weight of the iron-titanium oxide bearing material and alkali metal hydroxide.

6. A method of separating titanium from iron-titanium oxide bearing material which comprises contacting with fused alkali metal hydroxide said material without substantial reduction of iron oxide to metallic iron to form a composition having a liquid component rich in titanium and a solid component rich in iron oxide insoluble in the fused alkali metal hydroxide and separating resulting titanium-rich liquid component from an iron oxide-rich solid component.

7. The method of claim 6 wherein the resulting titanium-rich liquid component is separated from the iron oxide rich solid component by settling and removing liquid component from iron oxide-rich residual solid component.

8. The method of claim 6 wherein the titanium-rich component is leached with a solvent for alkali metal hydroxide to remove said hydroxide therefrom and a titanium-rich product in solid state is recovered.

9. The method of claim 6 wherein the iron-titanium bearing material is ilmenite.

10. A method of separating oxides of elements forming solid oxides which comprises contacting with fused alkali metal hydroxide a composition comprising oxides of elements in solid state, one of the oxides being soluble and one being insoluble in the fused alkali metal hydroxide, with substantial reduction of the insoluble oxide to elemental state to form a composition having a liquid component rich in an element of an oxide soluble in the fused alkali metal hydroxide and a solid component rich in an oxide insoluble in the fused alkali metal hydroxide, separating solid component rich in an oxide insoluble in the fused alkali metal hydroxide from liquid component, leaching so separated liquid component with a solvent for alkali metal hydroxide to remove alkali metal hydroxide therefrom, recovering soluble oxide in solid state, allowing the leach solution to stand until trace impurities settle out, and separating said trace impurities from the leach solution.

11. The method of claim 10 wherein the thus-purified leach solution is recycled to react with more of the composition comprising oxides of several elements in solid state.

12. The method of claim 10 wherein the composition comprising oxides of several elements in solid state and being contacted with fused alkali metal hydroxide is an iron-titanium bearing material.

13. The method of claim 10 wherein the composition comprising oxides of several elements in solid state and being contacted with fused alkali metal hydroxide is ilmenite.

14. The method of claim 10 wherein the solvent for alkali metal hydroxide is water.

15. The method of claim 10 wherein the alkali metal hydroxide is sodium hydroxide.

16. A method of separating titanium from iron-titanium oxide bearing material which comprises contacting with fused alkali metal hydroxide said material without substantial reduction of iron oxide to metallic iron, to form a composition having a liquid component rich in titanium and a solid component rich in iron oxide insoluble in the fused alkali metal hydroxide, separating resulting titanium-rich liquid component from a resulting iron oxide rich solid component, cooling separated liquid component until a substantially titaniferous portion precipitates, separating titaniferous precipitate from the remaining liquid and recycling said liquid to react with more titaniferous-iron oxide ore.

17. The method of claim 16 wherein the titaniferous-iron ore is ilemite.

References Cited in the file of this patent

UNITED STATES PATENTS

| | | |
|---|---|---|
| 617,636 | Buddeus | Jan. 10, 1899 |
| 1,106,406 | Rossi et al | Aug. 11, 1914 |
| 1,760,992 | Palmer | June 3, 1930 |
| 1,796,026 | Iredell | Mar. 10, 1931 |
| 1,932,087 | Richter | Oct. 24, 1933 |
| 2,079,805 | Judd | May 11, 1937 |
| 2,496,993 | Goda | Feb. 7, 1950 |
| 2,537,229 | McLaren | Jan. 9, 1951 |